United States Patent
Song et al.

(10) Patent No.: US 12,308,917 B2
(45) Date of Patent: May 20, 2025

(54) METHOD FOR DETERMINING OCCUPANCY TIME OF CHANNEL STATE INFORMATION CSI PROCESSING UNIT, AND TERMINAL DEVICE

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 748 days.

(21) Appl. No.: 17/217,858

(22) Filed: Mar. 30, 2021

(65) Prior Publication Data

US 2021/0218453 A1 Jul. 15, 2021

Related U.S. Application Data

(63) Continuation of application No. PCT/CN2019/101974, filed on Aug. 22, 2019.

(30) Foreign Application Priority Data

Sep. 30, 2018 (CN) .......................... 201811161675.9
Nov. 9, 2018 (CN) .......................... 201811333704.5

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0695* (2013.01); *H04L 5/0057* (2013.01);
(Continued)

(58) Field of Classification Search
CPC ... H04B 7/0626; H04B 7/0695; H04L 5/0048; H04L 5/0053; H04L 5/0057; H04L 5/0082; H04L 5/0091
See application file for complete search history.

(56) References Cited

U.S. PATENT DOCUMENTS

2019/0222282 A1* 7/2019 Tsai .................... H04W 72/566
2019/0312622 A1 10/2019 Fu et al.
(Continued)

FOREIGN PATENT DOCUMENTS

| CN | 108365915 A | 8/2018 |
|---|---|---|
| WO | 2013/046026 A1 | 4/2013 |

OTHER PUBLICATIONS

Huawei et al., "Remaining issues on RS multiplexing," 3GPP TSG RAN WG1 Meeting #93, R1-1805956, pp. 1-4, (May 2018).
(Continued)

*Primary Examiner* — Pao Sinkantarakorn
(74) *Attorney, Agent, or Firm* — BROOKS KUSHMAN P.C.

(57) ABSTRACT

This disclosure discloses a method for determining an occupancy time of a channel state information (CSI) processing unit, and a terminal device. The method includes: determining an occupancy time of the CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement.

20 Claims, 7 Drawing Sheets

(51) Int. Cl.
   *H04W 24/10* (2009.01)
   *H04W 72/0446* (2023.01)
   *H04W 72/21* (2023.01)
   *H04W 72/53* (2023.01)
   *H04W 74/0833* (2024.01)

(52) U.S. Cl.
   CPC ....... *H04W 24/10* (2013.01); *H04W 72/0446* (2013.01); *H04W 72/21* (2023.01); *H04W 72/53* (2023.01); *H04W 74/0833* (2013.01)

(56) References Cited

U.S. PATENT DOCUMENTS

| | | | |
|---|---|---|---|
| 2020/0136780 A1* | 4/2020 | Chen | H04L 5/0057 |
| 2020/0177254 A1* | 6/2020 | Lee | H04W 76/27 |
| 2021/0298038 A1* | 9/2021 | Kang | H04L 5/0057 |
| 2021/0351824 A1* | 11/2021 | Kim | H04B 7/024 |

OTHER PUBLICATIONS

3rd Generation Partnership Project, "Technical Specification Group Radio Access Network," 3GPP TS 38.214, pp. 1-94, (Jun. 2018).

JP Office Action dated May 31, 2022 as received in Application No. 2021-517753.

European Search Report dated Oct. 25, 2021 as received in application No. 19864605.1.

"Maintenance for CSI Reporting" 3GPP TSG RAN WG1 Meeting #92bis. R1-1804786. Apr. 16, 2018. Qualcomm Incorporated.

"Remaining issues on CSI reporting" 3GPP TSG RAN WG1 Meeting #92. R1-1805040. Apr. 16, 2018. NTT Docomo.

"Summary of remaining issues on CSI reporting" 3GPP TSG RAN WG1 Meeting #93. R1-1805950. May 21, 2018. Huwawei, HiSilicon.

"Remaining issues on CSI Reporting" 3GPP TSG RAN WG1 Meeting #93. R1-1806506. May 21, 2018. Intel Corporation.

Ericsson, "Corrections and clarifications for CSI reporting," 3GPP TSG-RAN WG1 Meeting #93, R1-1806216, pp. 1-19, (May 25, 2018).

3GPP, "Technical Specification Group Radio Access Network," 3GPP TS 38.213, pp. 1-99, (Jun. 30, 2018).

ZTE, "Maintenance for UL power control," 3GPP TSG RAN WG1 Meeting #94bis, R1-1810217, pp. 1-6, (Sep. 29, 2018).

Written Opinion of the International Searching Authority dated Apr. 8, 2021 as received in Application No. PCT/CN2019/101974.

* cited by examiner

102

Determine an occupancy time of a CSI processing unit based on a CSI report type in a CSI report configuration, where the CSI report type includes that CSI information to be reported by a terminal device to a network device is beam measurement information, or that the CSI information to be reported to the network device has no content and a channel state information reference signal CSI-RS resource is not used for tracking reference signal TRS measurement

FIG. 1

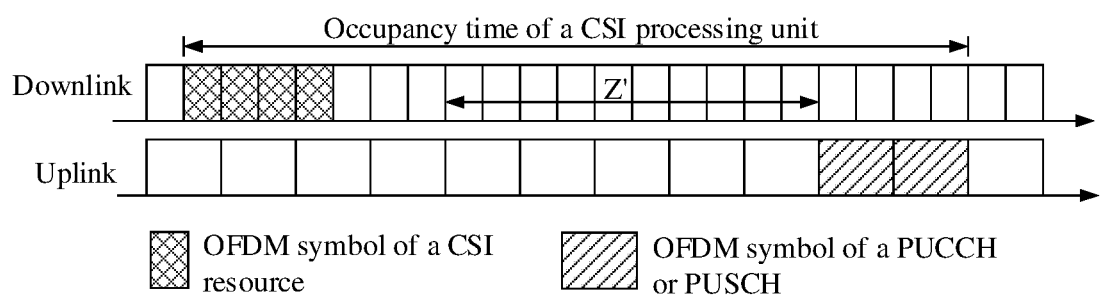

FIG. 2

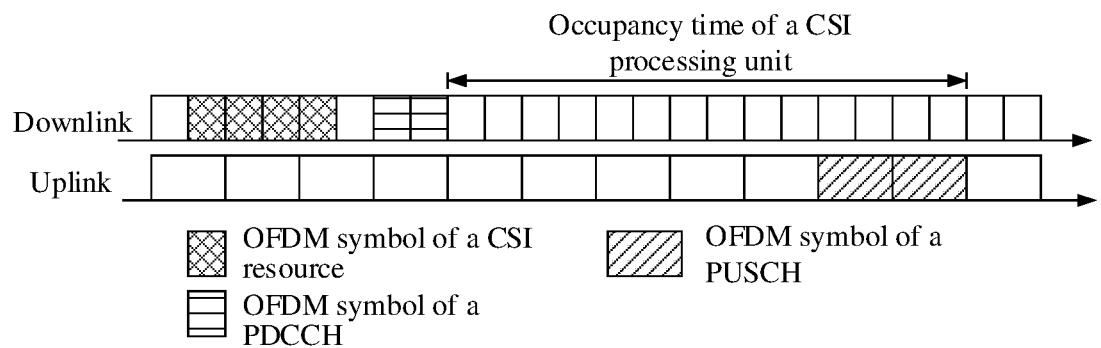

FIG. 3

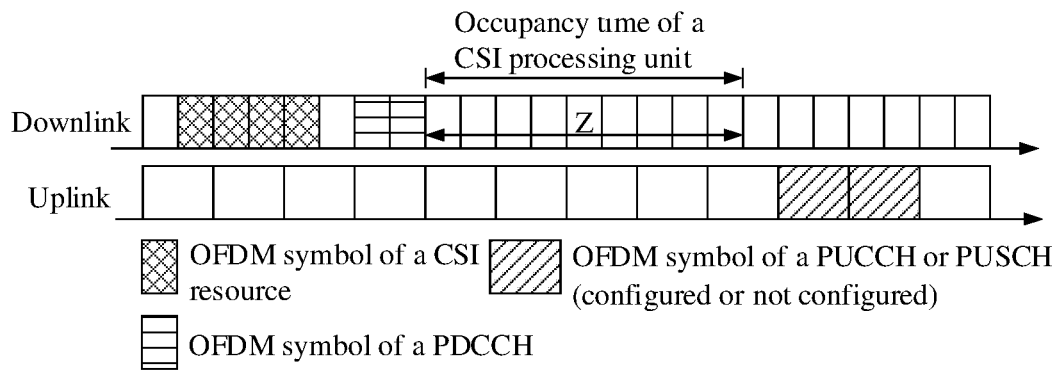
FIG. 9
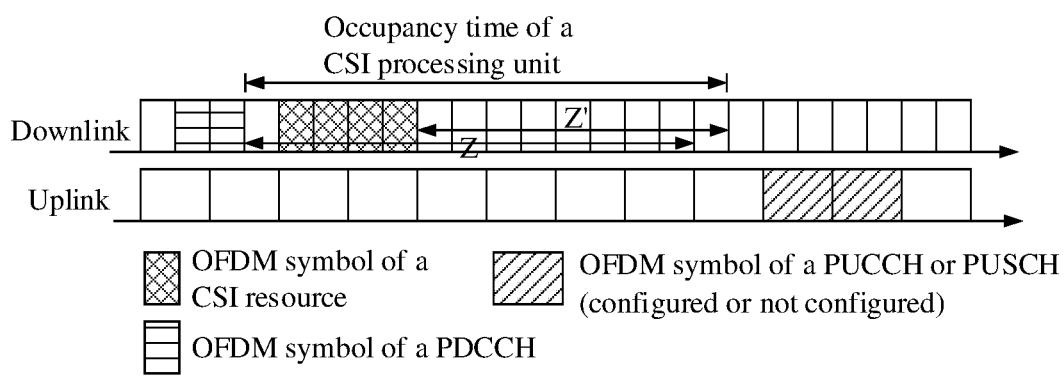
FIG. 10
```
                                         112
```
When a CSI report configuration is not configured by a network device and a CSI-RS resource configuration is configured by the network device, determine an occupancy time of a CSI processing unit based on a CSI-RS resource transmitted by the network device each time
FIG. 11

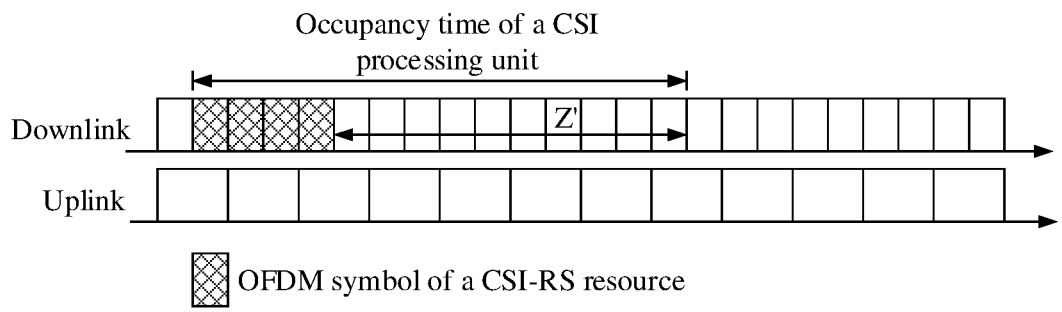

FIG. 12

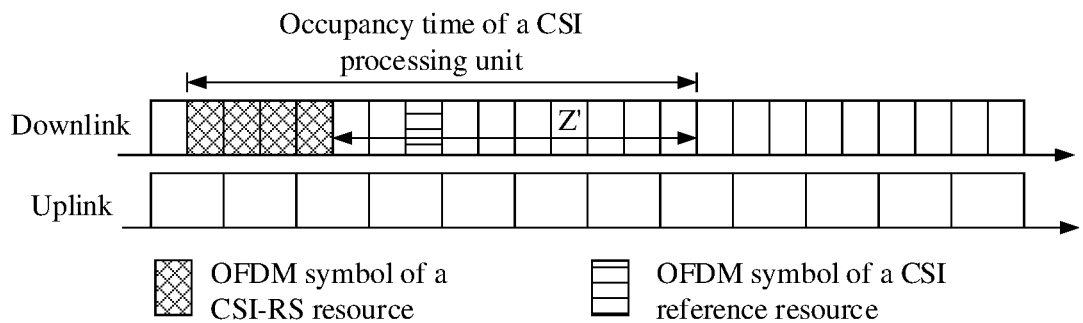

During link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel PRACH and the PRACH is a contention-based PRACH, determine a target received power of a PUCCH based on a target received power configured for a cell and a target received power specific to the terminal device

FIG. 14

METHOD FOR DETERMINING OCCUPANCY TIME OF CHANNEL STATE INFORMATION CSI PROCESSING UNIT, AND TERMINAL DEVICE

CROSS-REFERENCE TO RELATED APPLICATIONS

This application is a continuation of International Application No. PCT/CN2019/101974 filed on Aug. 22, 2019, which claims priority to Chinese patent application No. 201811161675.9 filed in China on Sep. 30, 2018, and Chinese Patent application No. 201811333704.5 filed in China on Nov. 9, 2018, which are incorporated herein by reference in their entirety.

TECHNICAL FIELD

This disclosure relates to the communication field, and in particular to, a method for determining an occupancy time of a channel state information (CSI) processing unit, and a terminal device.

BACKGROUND

In beam management, a terminal device is able to measure a plurality of transmit beams of a network device or a plurality of receive beams of the terminal device to obtain beam measurement information, and determine, based on different application scenarios, whether CSI information to be reported to the network device is beam measurement information. For example, when the terminal device measures a plurality of transmit beams of a base station, or measures a plurality of transmit beams of the network device or a plurality of receive beams of the terminal device, the CSI information to be reported by the terminal device to the network device is beam measurement information; when the network device uses a fixed transmit beam, and the terminal device measures the plurality of receive beams of the terminal device on the transmit beam, the CSI information to be reported by the terminal device to the network device has no content, that is, the beam measurement information is not reported to the network device.

Generally, when performing beam measurement, the terminal device needs to use a CSI processing unit of the terminal device and determine an occupancy time of the CSI processing unit. However, in beam management, the occupancy time of the CSI processing unit still cannot be determined in the related art.

SUMMARY

Embodiments of this disclosure provide a method for determining an occupancy time of a channel state information (CSI) processing unit, and a terminal device, so as to resolve the problem that an occupancy time of a CSI processing unit cannot be determined in beam management.

In order to resolve the foregoing technical problems, this disclosure is implemented as follows:

According to a first aspect, a method for determining an occupancy time of a channel state information (CSI) processing unit is provided, applied to a terminal device and including:

determining an occupancy time of the CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement.

According to a second aspect, a terminal device is provided and includes:

a determining module, configured to determine an occupancy time of a CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement.

According to a third aspect, a terminal device is provided, where the terminal device includes a processor, a memory, and a computer program stored in the memory and capable of running on the processor, and when the computer program is executed by the processor, the steps of the method according to the first aspect are implemented.

According to a fourth aspect, a computer-readable storage medium is provided, where a computer program is stored in the computer-readable storage medium, and when the computer program is executed by a processor, the steps of the method according to the first aspect are implemented.

In the technical solutions provided in the embodiments of this disclosure, in beam management, during determining of the occupancy time of the CSI processing unit in the terminal device, the occupancy time of the CSI processing unit may be determined based on the CSI report type in the CSI report configuration, where the CSI report type includes that the CSI information to be reported by the terminal device to the network device is the beam measurement information, or the CSI information to be reported to the network device has no content and the channel state information reference signal (CSI-RS) resource is not used for tracking reference signal (TRS) measurement. In this way, in beam management, in two application scenarios in which the CSI information to be reported to the network device is the beam measurement information, and the reported CSI information has no content and the CSI-RS resource is not used for TRS measurement, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

According to a fifth aspect, a method for determining an occupancy time of a channel state information (CSI) processing unit is provided, applied to a terminal device and including:

when a CSI report configuration is not configured by a network device and a CSI-RS resource configuration is configured by the network device, determining an occupancy time of the CSI processing unit based on a CSI-RS resource transmitted by the network device each time.

According to a sixth aspect, a terminal device is provided and includes:

a determining module, configured to: when a CSI report configuration is not configured by a network device and a CSI-RS resource configuration is configured by the network device, determine an occupancy time of a CSI processing unit based on a CSI-RS resource transmitted by the network device each time.

According to a seventh aspect, a terminal device is provided, where the terminal device includes a processor, a memory, and a computer program stored in the memory and capable of running on the processor, and when the computer program is executed by the processor, the steps of the method according to the fifth aspect are implemented.

According to an eighth aspect, a computer-readable storage medium is provided, where a computer program is stored in the computer-readable storage medium, and when the computer program is executed by a processor, the steps of the method according to the fifth aspect are implemented.

According to the technical solutions provided in the embodiments of this disclosure, in the beam management, in an application scenario in which the CSI report configuration is not configured, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

According to a ninth aspect, a method for determining a target received power of a PUCCH is provided, applied to a terminal device and including:

during link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel (PRACH) and the PRACH is a contention-based PRACH, determining a target received power of a PUCCH based on a target received power configured for a cell and a target received power specific to the terminal device.

According to a tenth aspect, a terminal device is provided and includes:

a power determining module, configured to: during link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel (PRACH) and the PRACH is a contention-based PRACH, determine a target received power of a PUCCH based on a target received power configured for a cell and a target received power specific to the terminal device.

According to an eleventh aspect, a terminal device is provided, where the terminal device includes a processor, a memory, and a computer program stored in the memory and capable of running on the processor, and when the computer program is executed by the processor, the steps of the method according to the ninth aspect are implemented.

According to a twelfth aspect, a computer-readable storage medium is provided, where a computer program is stored in the computer-readable storage medium, and when the computer program is executed by a processor, the steps of the method according to the ninth aspect are implemented.

According to the technical solutions provided in the embodiments of this disclosure, within the time after the terminal device successfully receives the link recovery response from the network device and before the terminal device successfully receives the MAC CE activation or RRC reconfiguration that is related to the PUCCH space-related information, when the spatial filtering parameter used for PUCCH transmission is the same as that of the PRACH and the PRACH is the contention-based PRACH, the target received power of the PUCCH can be clarified based on the target received power configured for the cell and the target received power specific to the terminal device.

BRIEF DESCRIPTION OF DRAWINGS

The accompanying drawings described herein are intended for better understanding of this disclosure, and constitute a part of this disclosure. Exemplary embodiments and descriptions thereof in this disclosure are intended to interpret this disclosure and do not constitute any improper limitation on this disclosure. In the accompanying drawings:

FIG. 1 is a schematic flowchart of a method for determining an occupancy time of a channel state information (CSI) processing unit according to an embodiment of this disclosure;

FIG. 2 is a schematic diagram of a method for determining an occupancy time of a channel state information (CSI) processing unit according to an embodiment of this disclosure;

FIG. 3 is a schematic diagram of a method for determining an occupancy time of a channel state information (CSI) processing unit according to an embodiment of this disclosure;

FIG. 9 is a schematic diagram of a method for determining an occupancy time of a channel state information (CSI) processing unit according to an embodiment of this disclosure;

FIG. 10 is a schematic diagram of a method for determining an occupancy time of a channel state information (CSI) processing unit according to an embodiment of this disclosure;

FIG. 11 is a schematic flowchart of a method for determining an occupancy time of a channel state information (CSI) processing unit according to an embodiment of this disclosure;

FIG. 12 is a schematic diagram of a method for determining an occupancy time of a channel state information (CSI) processing unit according to an embodiment of this disclosure;

FIG. 13 is a schematic diagram of a method for determining an occupancy time of a channel state information (CSI) processing unit according to an embodiment of this disclosure;

FIG. 14 is a schematic flowchart of a method for determining a target received power of a PUCCH according to some embodiments of this disclosure;

DESCRIPTION OF EMBODIMENTS

Figure 4:
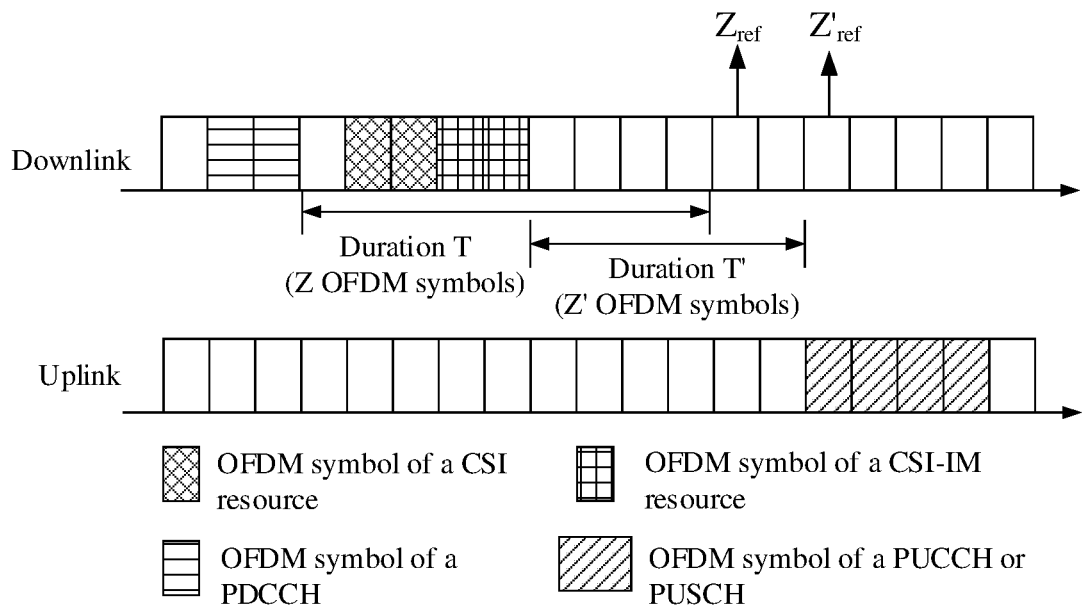
FIG. 4 is a schematic diagram of a method for determining an occupancy time of a channel state information (CSI) processing unit according to an embodiment of this disclosure.

In beam management, a network device (for example, a transmission reception point (TRP)) may have a plurality of transmit beams, and a terminal device may also have a plurality of receive beams. Generally, before communicating with a base station, the terminal device may measure a plurality of transmit beams of the network device or a plurality of receive beams of the terminal device, to determine an optimal transmit beam used by the network device or an optimal receive beam used by the terminal device during communication with the network device.

For implementation of beam measurement by the terminal device, the network device may configure a synchronization signal block (SSB) resource or a channel state information reference signal (CSI-RS) resource, where signals on different SSB resources or CSI-RS resources may be transmitted through different transmit beams, and the terminal device can implement beam measurement based on parameters such as a received signal strength.

The following uses three typical application scenarios as examples.

In a first application scenario, the terminal device measures a plurality of transmit beams of the network device and a plurality of receive beams of the terminal device.

Specifically, the terminal device may scan a plurality of receive beams of the terminal device on each transmit beam of the network device, and determine the optimal receive beam corresponding to each transmit beam based on parameters such as received signal strengths of the plurality of receive beams. Based on the optimal receive beams, one or more corresponding transmit beams can be determined.

In a second application scenario, the terminal device measures a plurality of transmit beams of the network device.

Specifically, the terminal device may use a fixed receive beam, may scan a plurality of transmit beams of the network device on the receive beam, and determines one or more optimal transmit beams based on parameters such as received signal strengths of the plurality of transmit beams.

The second application scenario may be considered as a special case of the first application scenario. Compared with the first application scenario, in the second application scenario, more accurate transmit beam scanning in a small range can be implemented.

In a third application scenario, the terminal device measures a plurality of receive beams of the terminal device.

Specifically, the network device may use a fixed transmit beam, and the terminal device scans a plurality of receive beams of the terminal device on the fixed transmit beam of the network device, and determines one or more optimal receive beams based on parameters such as received signal strengths of the plurality of receive beams.

The first application scenario is a combination of the second application scenario and the third application scenario. After the terminal device performs beam measurement in the foregoing three application scenarios, corresponding beam measurement information can be obtained and recorded in the terminal device. In the first application scenario and the second application scenario, the terminal device may report the beam measurement information as CSI information to the network device, so that the network device can communicate with the terminal device by using an appropriate transmit beam. In the third application scenario, the network device uses the fixed transmit beam, and therefore the CSI information to be reported by the terminal device to the network device has no content, that is, the beam measurement information is not reported to the network device. In this way, when the network device uses the fixed transmit beam to communicate with the terminal device, the terminal device may select an appropriate receive beam based on locally recorded beam measurement information.

Before the terminal device reports the beam measurement information to the network device in the form of a CSI report, the network device may indicate CSI report configuration to the terminal device.

Specifically, the network device may transmit radio resource control (RRC) signaling to the terminal device, and include CSI report configuration (CSI-Report Config) in the RRC signaling. In beam management, configuration options of a report quantity (reportQuantity) in the CSI report configuration may mainly include: cri-reference signal received power (cri-RSRP), ssb-Index-RSRP, or none.

After receiving the CSI report configuration indicated by the network device, the terminal device may obtain corresponding beam measurement information based on the indication.

During obtaining of the beam measurement information, the terminal device usually needs to occupy a CSI processing unit of the terminal device. If the terminal device is capable of supporting calculation of N pieces of CSI simultaneously, it means that the terminal device has N CSI processing units. If L CSI processing units of the terminal device are occupied in a given orthogonal frequency division multiplexing (OFDM) symbol, N-L CSI processing units are available in the terminal device.

However, in beam management, the occupancy time of the CSI processing unit still cannot be clarified in the related art.

In view of this, the embodiments of this disclosure provide a method for determining an occupancy time of a channel state information (CSI) processing unit, and a terminal device. The method is applied to the terminal device and includes: determining an occupancy time of the CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement.

That the CSI information described in the embodiments of this disclosure has no content can be understood as: the report quantity in the CSI report configuration may be set to none.

In this way, in beam management, in two application scenarios in which the CSI information to be reported to the network device is the beam measurement information, and the reported CSI information has no content and the CSI-RS resource is not used for TRS measurement, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The technical solutions of this disclosure may be applied to various communications systems, such as a Global System for Mobile communications (GSM), a Code Division Multiple Access (CDMA) system, Wideband Code Division Multiple Access (WCDMA), General Packet Radio Service (GPRS), Long Term Evolution (LTE)/Long Term Evolution advanced (LTE-A) system, and New Radio (NR).

A terminal device can be understood as user equipment (UE), also referred to as a mobile terminal (Mobile Terminal), mobile user equipment, or the like, and may communicate with one or more core networks via a radio access network (for example, Radio Access Network, RAN). The user equipment may be a mobile terminal such as a mobile phone (or referred to as "cellular" phone) and a computer having a mobile terminal, such as a portable, pocket-sized, handheld, computer built-in, or in-vehicle mobile apparatus, or the user equipment may be a flying device such as a drone or an aircraft, which exchanges voice and/or data with the radio access network.

A base station may be a base station (BTS) in GSM or CDMA, or may be a base station (NodeB) in WCDMA, or may be an evolved NodeB (eNB or e-NodeB) in LTE or 5G NodeB (gNB), which is not limited in this disclosure. However, for ease of description, the following embodiments are described by using a gNB as an example.

The application scenarios in this disclosure may include at least two application scenarios, that is, the terminal device measures a plurality of transmit beams of the network device, and the terminal device measures a plurality of transmit beams of the terminal device. In the two application scenarios, the terminal device may clarify the occupancy time of the CSI processing unit in the terminal device based on the technical solutions provided in the embodiments of this disclosure.

The technical solutions provided in the embodiments of this disclosure are described in detail below with reference to the accompanying drawings.

FIG. 1 is a schematic flowchart of a method for determining an occupancy time of a channel state information (CSI) processing unit according to an embodiment of this disclosure. The method is applied to a terminal device, and the method is described as follows.

S102: Determine an occupancy time of a CSI processing unit based on a CSI report type in a CSI report configuration.

In S102, in an application scenario of beam measurement, during determining of the occupancy time of the CSI processing unit, the occupancy time of the CSI processing unit may be determined based on the CSI report type in the CSI report configuration.

In this embodiment of this disclosure, the CSI report type configured by the network device may include two types. One is that CSI information to be reported by the terminal device to the network device is beam measurement information; and the other is that the CSI information to be reported by the terminal device to the network device has no content, and a CSI-RS resource is not used for a tracking reference signal (TRS), that is, a higher-layer parameter trs-Info of a CSI-RS resource set CSI-RS-ResourceSet in a CSI resource configuration associated with the CSI report configuration is not configured. That the CSI information to be reported by the terminal device to the network device has no content can be understood as: the terminal device does not report the beam measurement information to the network device.

The beam measurement information may include a beam measurement quantity corresponding to a resource index of an SSB, or a beam measurement quantity corresponding to a resource index of a CSI-RS. The beam measurement quantity may include L1-RSRP, or may include at least one of L1-reference signal received quality (L1-RSRQ) and L1-signal to interference plus noise ratio (L1-SINR).

That the terminal device reports the beam measurement information to the network device may correspond to an application scenario in which the terminal device measures a plurality of transmit beams of the network device. In this case, the terminal device needs to report information about measured transmit beams to the network device.

That the beam measurement information to be reported by the terminal device to the network device has no content and the CSI-RS resource is not used for TRS measurement may correspond to an application scenario in which the terminal device measures a plurality of transmit beams of the terminal device. In this case, the terminal device does not need to report information about a measured receive beam to the network device.

In one embodiment of this disclosure, when the CSI report type is reporting the beam measurement information to the network device, the determining the occupancy time of the CSI processing unit may include:

determining the occupancy time of the CSI processing unit based on a time-domain characteristic of the CSI report.

In this embodiment, when the CSI information to be reported by the terminal device to the network device is the beam measurement information, the occupancy time of the CSI processing unit may be determined based on the time-domain characteristic of the CSI report. When the CSI information to be reported by the terminal device to the network device is the beam measurement information, a report quantity in a corresponding CSI report configuration may be set to cri-RSRP and ssb-Index-RSRP.

The time-domain characteristic of the CSI report may include two types. One may be periodic or semi-persistent, and the other may be aperiodic. When the time-domain characteristic of the CSI report is periodic or semi-persistent, the CSI report may be a periodic or semi-persistent CSI report based on an SSB resource, or may be a periodic or semi-persistent CSI report based on a periodic CSI-RS resource, or may be a periodic or semi-persistent CSI report based on a semi-persistent CSI-RS resource. When the time-domain characteristic of the CSI report is aperiodic, the CSI report may be an aperiodic CSI report based on an SSB resource, or may be an aperiodic CSI report based on a periodic CSI-RS resource, or may be an aperiodic CSI report based on a semi-persistent or aperiodic CSI-RS resource, which is not specifically limited herein.

The following describes how to determine the occupancy time of the CSI processing unit for two different time-domain characteristics of the CSI report.

In an implementation, when the time-domain characteristic of the CSI report is periodic or semi-persistent, the determining the occupancy time of the CSI processing unit may include:

the occupancy time of the CSI processing unit starts from the 1st OFDM symbol of a CSI resource until the last OFDM symbol of a physical uplink shared channel (Physical Uplink Shared Channel, PUSCH) or physical uplink control channel (Physical Uplink Control Channel, PUCCH) used for transmitting the CSI report.

The CSI resource is a most-recently-transmitted CSI resource that is Z' OFDM symbols prior to the 1st OFDM symbol of the PUSCH or the PUCCH.

In an embodiment, the CSI resource may include one type of resource, and the one type of resource may include at least one SSB resource or at least one CSI-RS resource configured in one CSI resource configuration (CSI-ResourceConfig) associated with the CSI report configuration.

In another embodiment, the CSI resource may alternatively include a plurality of types of resources, and the plurality of types of resources may include at least one SSB resource or at least one CSI-RS resource configured in one CSI resource configuration associated with the CSI report configuration, and at least one interference measurement resource or at least one received signal strength indication (RSSI) measurement resource configured in another CSI resource configuration associated with the CSI report configuration.

That is, the CSI resource needs to include at least one SSB resource or at least one CSI-RS resource, and on this basis, may also include at least one interference measurement resource or at least one RSSI measurement resource. The SSB resource or the CSI-RS resource may be used for measuring the reference signal received power, and the reference signal received power may be an L1-RSRP or may be a numerator corresponding to an L1-SINR. The interference measurement resource may be used for noise and interference power measurement, and the RSSI measurement resource may be used for RSSI measurement.

It should be noted that when the CSI resource includes one type of resource, the 1st OFDM symbol of the CSI resource may be understood as the 1st OFDM symbol of the at least one SSB resource or the at least one CSI-RS resource; and when the CSI resources include a plurality of types of resources, the plurality of resources are transmitted at one time, and the 1st OFDM symbol of the CSI resource may be understood as the 1st OFDM symbol of an earliest-transmitted resource in the plurality of types of resources.

Z' may be understood as a quantity of OFDM symbols required by the terminal device for calculating the beam measurement information.

In this embodiment of this disclosure, Z' may be obtained based on $BR_i$ that is determined in Table 1.

TABLE 1

| # | Characteristic group | Composition information | Value |
|---|---|---|---|
| 2-25 | Timing for beam reporting | 1. A quantity $X_i$ of symbols between the last OFDM symbol of the SSB/CSI-RS and the 1st OFDM symbol of a channel transmitting a beam report is at least $BR_i$, where i is a subcarrier spacing (SCS, Sub-carrier Spacing) index, and i being 1, 2, 3, or 4 corresponds to a subcarrier spacing of 15 KHz, 30 KHz, 60 KHz, or 120 kHz, respectively. | Candidate value sets: $BR_1$ is {2,4,8}; $BR_2$ is {4,8,14,[28]}; $BR_3$ is {8,14,28}; and $BR_4$ is {14,28,56}. |

For ease of understanding of the occupancy time of the CSI processing unit, refer to FIG. 2.

In FIG. 2, it is assumed that a subcarrier spacing of the terminal device (corresponding to the uplink) is different from a subcarrier spacing of the network device (corresponding to the downlink). Each small square represents one OFDM symbol.

In downlink OFDM symbols, the 2nd to 5th OFDM symbols from left to right are OFDM symbols of the CSI resource, and the CSI resource is a most-recently-transmitted CSI resource that is Z' OFDM symbols prior to the 1st OFDM symbol of the PUSCH or the PUCCH transmitting the CSI report.

In uplink OFDM symbols, the 2nd and 3rd OFDM symbols from right to left are the OFDM symbols of the PUCCH or the PUSCH used for transmitting the CSI report.

It can be seen from FIG. 2 that the occupancy time of the CSI processing unit starts from the 1st OFDM symbol of the CSI resource until the last OFDM symbol of the PUSCH or PUCCH.

In general, when the terminal device reports the beam measurement information to the network device, if the time-domain characteristic of the CSI report is periodic or semi-persistent, the occupancy time of the CSI processing unit starts from the 1st OFDM symbol of the most-recently-transmitted CSI resource that is Z' OFDM symbols prior until the 1st OFDM symbol of the PUSCH or the PUCCH transmitting the CSI report (if any) until the last OFDM symbol of the PUSCH or PUCCH transmitting the CSI report.

In another implementation, when the time-domain characteristic of the CSI report is aperiodic, the determining the occupancy time of the CSI processing unit may include:

the occupancy time of the CSI processing unit starts from the 1st OFDM symbol after a physical downlink control channel (Physical Downlink Control Channel, PDCCH) triggering the CSI report until the last OFDM symbol of a PUSCH transmitting the CSI report.

The PDCCH triggering the CSI report may include downlink control information (DCI), and the network device may trigger the CSI report by using a CSI request field (CSI request field) in the DCI.

For ease of understanding of the occupancy time of the CSI processing unit, refer to FIG. 3.

In FIG. 3, it is assumed that a subcarrier spacing of the terminal device is different from a subcarrier spacing of the network device, and each small square represents one OFDM symbol.

In downlink OFDM symbols, the 2nd to 5th OFDM symbols from left to right are OFDM symbols of the CSI resource, and the 7th and 8th OFDM symbols are OFDM symbols of the PDCCH used for triggering the CSI report.

In uplink OFDM symbols, the 2nd and 3rd OFDM symbols from right to left may be OFDM symbols of the PUSCH used for transmitting the CSI report.

It can be seen from FIG. 3 that the occupancy time of the CSI processing unit starts from the 1st OFDM symbol after the PDCCH triggering the CSI report until the last OFDM symbol of the PUSCH transmitting the CSI report.

It should be noted that when the time-domain characteristic of the CSI report is aperiodic based on an aperiodic CSI resource, and the CSI report is updated only when the occupancy time of the CSI processing unit satisfies the following conditions:

1. If a timing advance amount is considered, the 1st uplink OFDM symbol of the PUSCH or PUCCH transmitting the CSI report is neither earlier than the $(Z_{ref})$th OFDM symbol nor earlier than the $(Z'_{ref})$th OFDM symbol.

2. A quantity of symbols between the last OFDM symbol of the CSI resource and the 1st OFDM symbol of the PUSCH or PUCCH transmitting the CSI report is greater than or equal to Z', and a quantity of symbols between the 1st OFDM symbol of the PDCCH triggering the CSI report and the 1st OFDM symbol of the PUSCH or PUCCH used for transmitting the CSI report is greater than or equal to Z.

In other words, the CSI report is updated only when it is ensured that the beam measurement information can be obtained through calculation.

$Z_{ref}$ may be defined as: a start time point of a cyclic prefix (CP) is located in a next uplink OFDM symbol that is T=(Z)(2048+144) K$2^{-\mu}$T$_c$ (seconds) after the last OFDM symbol of the PDCCH used for triggering the CSI report.

When the CSI report is a CSI report based on an aperiodic CSI-RS resource, $Z'_{ref}$ may be defined as: the start time point of the CP is located in a next uplink OFDM symbol that is T'=(Z)(2048+144)K$2^{-\mu}$T'$_c$ (seconds) after the last OFDM symbol of three resources: an aperiodic CSI-RS resource for channel measurement, an aperiodic CSI Interference Measurement (CSI-IM) resource for interference measurement, and an aperiodic NZP (Non-zero Power, non-zero power) CSI-RS resource for interference measurement.

For ease of understanding of $Z_{ref}$ and $Z'_{ref}$, refer to FIG. 4.

In FIG. 4, assuming that the terminal device and the network device use the same subcarrier spacing, $Z_{ref}$ may be expressed as the 1st OFDM symbol that is T duration after the last OFDM symbol of the PDCCH, and $Z'_{ref}$ may be expressed as the 1st OFDM symbol that is T' duration after the last OFDM symbol of the CSI-RS resource and the CSI-IM resource.

Z' may represent a quantity of OFDM symbols for calculating the beam measurement information, and is the same as Z' described in the first implementation.

Z is related to Z', where Z' may be obtained based on RB$_i$ that is determined in Table 1 recorded above, and a difference between Z and Z' may be a fixed value. The fixed value may be the same as a difference between $Z_1$ and $Z_1'$ or a difference between $Z_2$ and $Z_2'$ in a CSI report specified in the related art.

As shown in Table 2 and Table 3 below, in Table 2 and Table 3, u being 1, 2, 3, or 4 corresponds to a subcarrier spacing of 15 KHz, 30 KHz, 60 KHz, or 120 kHz, respectively. Table 2 is applicable to an application scenario with low latency requirements, and Table 3 is applicable to an application scenario with high latency requirements.

TABLE 2

|   | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 3

|   | $Z_1$ [symbols] | | $Z_2$ [symbols] | |
|---|---|---|---|---|
| μ | $Z_1$ | $Z'_1$ | $Z_2$ | $Z'_2$ |
| 0 | 22 | 16 | 40 | 37 |
| 1 | 33 | 30 | 72 | 69 |
| 2 | 44 | 42 | 141 | 140 |
| 3 | 97 | 85 | 152 | 140 |

Based on the foregoing Table 2 and Table 3, in a case in which Z' is known, the corresponding Z may be determined.

For example, in a low-latency scenario with the 30 KHz subcarrier spacing, if Z' is determined to be 8 based on the foregoing Table 1, $Z=Z_1-Z_1'+Z'=10$ can be obtained based on Z1 and Z1' that are corresponding to the 30 KHz subcarrier spacing in Table 2.

The foregoing describes how to determine the occupancy time of the CSI processing unit when the CSI information to be reported by the terminal device to the network device is the beam measurement information. The following describes how to determine the occupancy time of the CSI processing unit when the CSI information to be reported by the terminal device to the network device has no content and the CSI-RS resource is not used for TRS measurement.

In one embodiment of this disclosure, when the CSI report type is that the CSI information to be reported by the terminal device to the network device has no content and the CSI-RS resource is not used for TRS measurement, the determining the occupancy time of the CSI processing unit may include:

determining the occupancy time of the CSI processing unit based on a time-domain characteristic of the CSI report and a configuration status of a physical uplink resource, where the physical uplink resource is a PUCCH resource or a PUSCH resource.

In this embodiment, the occupancy time of the CSI processing unit may be determined based on the time-domain characteristic of the CSI report and the configuration status of the physical uplink resource (the PUCCH resource or the PUSCH resource). A report quantity in a corresponding CSI report configuration in this embodiment may be set to none.

When the CSI information to be reported by the terminal device to the network device has no content, the time-domain characteristic of the CSI report may also include two types. One may be periodic or semi-persistent, and the other may be aperiodic. When the time-domain characteristic of the CSI report is periodic or semi-persistent, the CSI report may be a periodic or semi-persistent CSI report based on an SSB resource, or may be a periodic or semi-persistent CSI report based on a periodic CSI-RS resource, or may be a semi-persistent CSI report based on a semi-persistent CSI-RS resource. When the time-domain characteristic of the CSI report is aperiodic, the CSI report may be an aperiodic CSI report based on an SSB resource, or may be an aperiodic CSI report based on a periodic or semi-persistent CSI-RS resource, or may be an aperiodic CSI report based on an aperiodic CSI-RS resource, which is not specifically limited herein.

The configuration status of the physical uplink resource may include two types. One is that the network device has configured the physical uplink resource for the terminal device, that is, the PUCCH resource or PUSCH resource is present; the other is that the network device has not configured the physical uplink resource for the terminal device, that is, the PUCCH resource or PUSCH resource is not present. When the physical uplink resource configured by the network device for the terminal device is 0, it can be understood that the network device has not configured the physical uplink resource for the terminal device.

The following describes how to determine the occupancy time of the CSI report separately for two different time-domain characteristics of the CSI report and two different configuration statuses of the physical uplink resource.

In a first implementation, when the time-domain characteristic of the CSI report is periodic or semi-persistent, and the network device has configured the physical uplink resource, the determining the occupancy time of the CSI processing unit may include:

the occupancy time of the CSI processing unit starts from the 1st OFDM symbol of a CSI resource until the (1+x)th OFDM symbol of a PUCCH or PUSCH configured for a periodic or semi-persistent CSI report; or the occupancy time of the CSI processing unit starts from the 1st OFDM symbol of a CSI resource until the last OFDM symbol of the PUCCH or PUSCH configured for the periodic or semi-persistent CSI report.

The CSI resource may be an earliest CSI resource in at least one most-recently-transmitted CSI resource that is Z' OFDM symbols prior to the 1st OFDM symbol of the PUSCH or the PUCCH.

The CSI resource needs to include at least one SSB resource or at least one CSI-RS resource in the CSI resource configuration associated with the CSI report configuration, and on this basis, may also include at least one interference measurement resource or at least one RSSI measurement resource in the CSI resource configuration associated with the CSI report configuration. For details, refer to the description of the CSI resource in the foregoing first embodiment, and details are not described herein again.

Z' is the same as Z' recorded in the first embodiment, that is, being the quantity of OFDM symbols required for calculating the beam measurement information. Z' may be specifically obtained based on $BR_i$ that is determined in Table 1 recorded above, and details are not described herein again.

x is an integer, where x=−1 indicates an OFDM symbol prior to the 1st OFDM symbol of the PUSCH or PUCCH configured for the CSI report, and the occupancy time of the CSI processing unit starts from the 1st OFDM symbol of the CSI resource until the OFDM symbol prior to the periodic or semi-persistent PUSCH or PUCCH configured for the CSI report.

x=0 indicates the 1st OFDM symbol of the PUSCH or PUCCH configured for the CSI report, and the occupancy time of the CSI processing unit starts from the 1st OFDM symbol of the CSI resource until the 1st OFDM symbol of the periodic or semi-persistent PUSCH or PUCCH configured for the CSI report.

X=1 indicates an OFDM symbol after the 1st OFDM symbol of the PUSCH or PUCCH configured for the CSI report, and the occupancy time of the CSI processing unit starts from the 1st OFDM symbol of the CSI resource until the OFDM symbol after the 1st OFDM symbol of the periodic or semi-persistent PUSCH or PUCCH configured for the CSI report.

Other cases may be derived by analogy.

Figure 5:
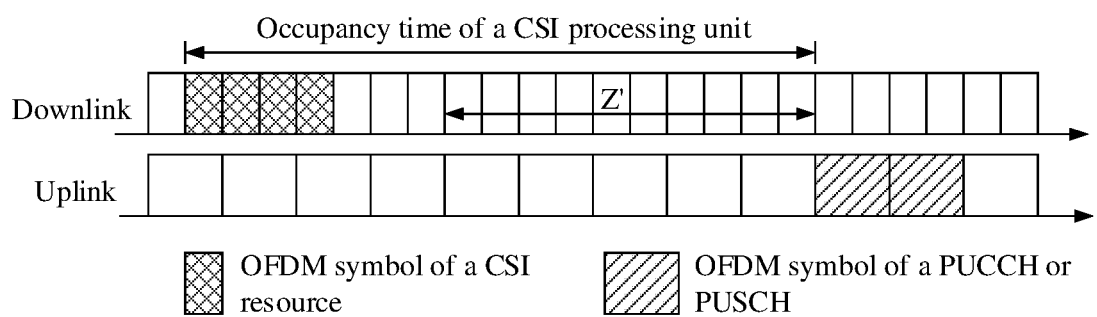
FIG. 5 is a schematic diagram of a method for determining an occupancy time of a channel state information (CSI) processing unit according to an embodiment of this disclosure.

For ease of understanding of the occupancy time of the CSI processing unit, x=−1 may be used as an example for description. Refer to FIG. 5.

In FIG. 5, it is assumed that a subcarrier spacing of the terminal device is different from a subcarrier spacing of the network device, and each small square represents one OFDM symbol.

In downlink OFDM symbols, the 2nd to 5th OFDM symbols from left to right are OFDM symbols of the CSI resource; the CSI resource is a most-recently-transmitted CSI resource that is Z' OFDM symbols prior to the 1st OFDM symbol of the PUSCH or the PUCCH configured for the CSI report; and the 7th and 8th OFDM symbols represent OFDM symbols of the PDCCH used for triggering the CSI report.

In uplink OFDM symbols, the 2nd and 3rd OFDM symbols from right to left are the OFDM symbols of the PUCCH or the PUSCH configured for the CSI report.

It can be seen from FIG. 5 that the occupancy time of the CSI processing unit starts from the 1st OFDM symbol of the CSI resource until the OFDM symbol prior to the periodic or semi-persistent PUSCH or PUCCH configured for the CSI report.

In general, when the CSI report is periodic or semi-persistent and the network device has configured the physical uplink resource, the occupancy time of the CSI processing unit starts from the 1st OFDM symbol of the most-recently-transmitted CSI resource that is duration of Z' OFDM symbols prior to the 1st symbol of the configured periodic or semi-persistent PUSCH/PUCCH (if any) until the 1st OFDM symbol of the periodic or semi-persistent PUSCH/PUCCH configured for the CSI report plus x OFDM symbols, or until the last OFDM symbol of the periodic or semi-persistent PUSCH/PUCCH configured for the CSI report, where x is an integer.

The CSI resource may alternatively be an earliest CSI resource in at least one most-recently-transmitted CSI resource that is not later than a CSI reference resource corresponding to the CSI report. The CSI reference resource may be a reference resource defined in a standard of the related art, or may be related to a CSI-RS resource that is transmitted periodically or semi-persistently. When the CSI reference resource is related to the CSI-RS resource transmitted periodically or semi-persistently, the CSI reference resource may be the 1st OFDM symbol of the 1st CSI-RS resource in at least one CSI-RS resource transmitted each time, or the last OFDM symbol of the last CSI-RS resource in the at least one CSI-RS resource transmitted each time.

Figure 6:
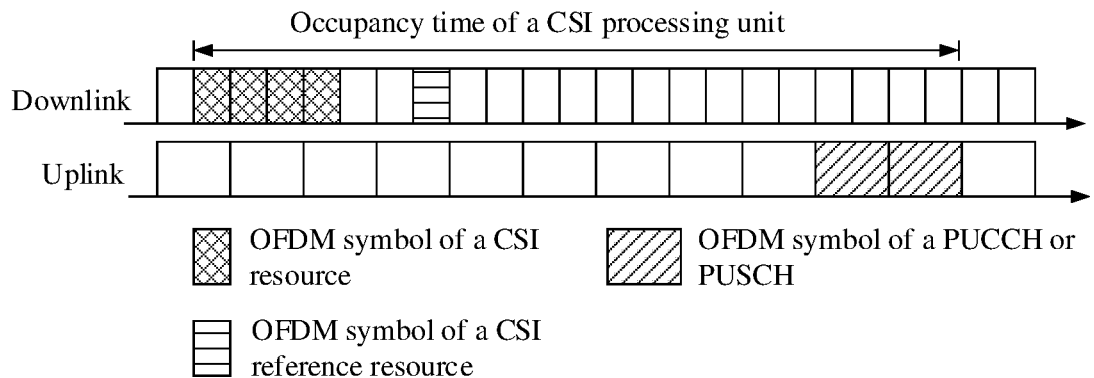
FIG. 6 is a schematic diagram of a method for determining an occupancy time of a channel state information (CSI) processing unit according to an embodiment of this disclosure.

For ease of understanding, refer to FIG. 6.

In FIG. 6, it is assumed that a subcarrier spacing of the terminal device is different from a subcarrier spacing of the network device, and each small square represents one OFDM symbol.

It can be seen from FIG. 6 that the occupancy time of the CSI processing unit starts from the 1st OFDM symbol of the CSI resource until the last OFDM symbol of the PUCCH or PUSCH configured for the CSI report. The CSI resource is a most-recently-transmitted CSI resource that is not later than the CSI reference resource corresponding to the CSI report, and a definition of the CSI reference resource is related to the CSI-RS resource transmitted each time.

In a second implementation, when the time-domain characteristic of the CSI report is periodic or semi-persistent, and the network device has configured or has not configured the physical uplink resource, the determining the occupancy time of the CSI processing unit may include:

the occupancy time of the CSI processing unit starts from the 1st OFDM symbol of a CSI resource until (Z'+y) OFDM symbols after the last OFDM symbol of the CSI resource.

The CSI resource may be an earliest CSI resource in at least one CSI resource transmitted each time.

The CSI resource needs to include at least one SSB resource or at least one CSI-RS resource in the CSI resource configuration associated with the CSI report configuration, and on this basis, may also include at least one interference measurement resource or at least one RSSI measurement resource in the CSI resource configuration associated with the CSI report configuration. For details, refer to the description of the CSI resource in the foregoing first embodiment, and details are not described herein again.

Z' is the same as Z' recorded in the first embodiment, that is, being the quantity of OFDM symbols required for calculating the beam measurement information. Z' may be specifically obtained based on $BR_i$ that is determined in Table 1 recorded above, and details are not described herein again.

y is an integer greater than or equal to 0, where y=0 represents Z' OFDM symbols after the last OFDM symbol of the CSI resource, and the occupancy time of the CSI processing unit starts from the 1st OFDM symbol of the CSI resource until the Z' OFDM symbols after the last OFDM symbol of the CSI resource.

y=1 represents (Z'+1) OFDM symbols after the last OFDM symbol of the CSI resource, and the occupancy time of the CSI processing unit starts from the 1st OFDM symbol of the CSI resource until the (Z'+1) OFDM symbols after the last OFDM symbol of the CSI resource.

Other cases may be derived by analogy.

Figure 7:
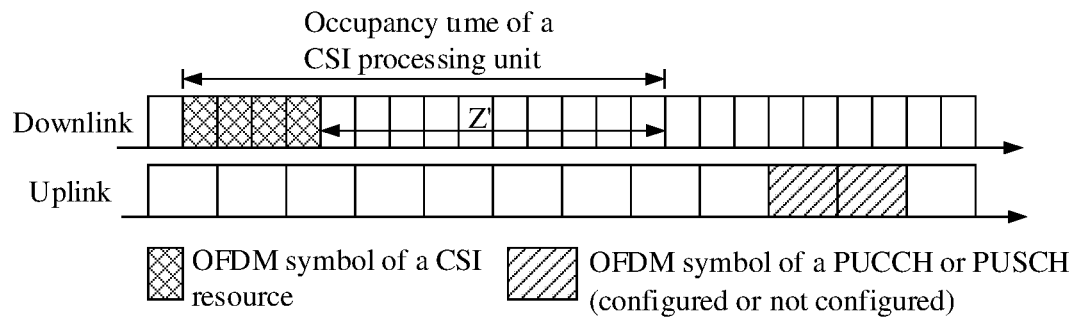
FIG. 7 is a schematic diagram of a method for determining an occupancy time of a channel state information (CSI) processing unit according to an embodiment of this disclosure.

For ease of understanding of the occupancy time of the CSI processing unit, y=0 may be used as an example for description. Refer to FIG. 7.

In FIG. 7, it is assumed that a subcarrier spacing of the terminal device is different from a subcarrier spacing of the network device, and each small square represents one OFDM symbol.

In downlink OFDM symbols, the 2nd to 5th OFDM symbols from left to right are OFDM symbols of the CSI resource transmitted at one time.

In uplink OFDM symbols, when the network device has configured the physical uplink resource, the 2nd and 3rd OFDM symbols from right to left are OFDM symbols of the configured physical uplink resource, that is, the OFDM symbols of the PUCCH or PUSCH configured for the CSI report.

It can be seen from FIG. 7 that the occupancy time of the CSI processing unit starts from the 1st OFDM symbol of the CSI resource until Z' OFDM symbols after the last OFDM symbol of the CSI resource.

In general, when the CSI report is periodic or semi-persistent, and the network device has configured or has not configured the physical uplink resource, the occupancy time of the CSI processing unit starts from the 1st OFDM symbol of the CSI resource transmitted each time until the Z' OFDM symbols after the last OFDM symbol of the CSI resource plus y OFDM symbols, and is not related to the physical uplink resource (that is, the PUCCH resource or PUSCH resource) configured for the CSI report.

The CSI resource may alternatively be an earliest CSI resource in at least one most-recently-transmitted CSI resource that is not later than the CSI reference resource corresponding to the CSI report. The CSI reference resource is the same as the CSI reference resource recorded above, and details are not described herein again.

Figure 8:
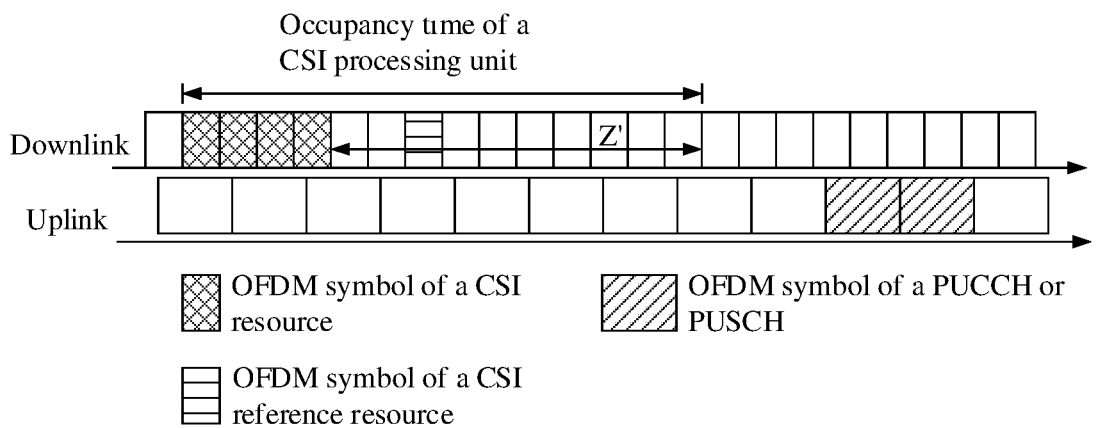
FIG. 8 is a schematic diagram of a method for determining an occupancy time of a channel state information (CSI) processing unit according to an embodiment of this disclosure.

For ease of understanding, refer to FIG. 8.

In FIG. 8, it is assumed that a subcarrier spacing of the terminal device is different from a subcarrier spacing of the network device, and each small square represents one OFDM symbol.

It can be seen from FIG. 8 that the occupancy time of the CSI processing unit starts from the 1st OFDM symbol of the CSI resource until Z' symbols after the last symbol of the CSI resource, where y=0. The CSI resource is a most-recently-transmitted CSI resource that is not later than a CSI reference resource corresponding to the CSI report, and the CSI reference resource is a CSI reference resource defined in a standard of the related art.

It should be noted that in the foregoing two implementations, that is, when the time-domain characteristic of the CSI report is periodic or semi-persistent, a measurement period and a slot offset of the CSI resource may be consistent with a transmission period and a slot offset of the CSI report resource.

The CSI resource needs to include at least one SSB resource or at least one CSI-RS resource in the CSI resource configuration associated with the CSI report configuration, and on this basis, may also include at least one interference measurement resource or at least one RSSI measurement resource in the CSI resource configuration associated with the CSI report configuration. After the network device configures the CSI resource related to the CSI report configuration for the terminal device, the measurement period and slot offset of the CSI resource during beam measurement of the terminal device may be the same as the transmission period and slot offset of the CSI resource configured by the network device, with no need to additionally specify the measurement period and slot offset of the CSI resource for the terminal device.

In a third implementation, when the time-domain characteristic of the CSI report is aperiodic and the network device has configured the physical uplink resource, the determining the occupancy time of the CSI processing unit may include:

the occupancy time of the CSI processing unit starts from the 1st OFDM symbol after the PDCCH triggering the CSI report until the last symbol of the PUSCH configured for the CSI report.

The PDCCH triggering the CSI report may include DCI, and the CSI report is triggered by using a CSI request field (CSI request field) in the DCI.

For a specific implementation of this embodiment, refer to the content recorded in the embodiments shown in FIG. 3 and FIG. 4. Details are not described herein again.

In a fourth implementation, when the time-domain characteristic of the CSI report is aperiodic and the network device has configured or has not configured the physical uplink resource, the determining the occupancy time of the CSI processing unit may include:

the occupancy time of the CSI processing unit starts from the 1st OFDM symbol after the PDCCH triggering the CSI report until one of a first OFDM symbol and a second OFDM symbol, or until a later one between the first OFDM symbol and the second OFDM symbol plus y OFDM symbols.

The first OFDM symbol is Z OFDM symbols after the 1st OFDM symbol that is after the PDCCH triggering the CSI report, and the second OFDM symbol is Z' OFDM symbols after the last OFDM symbol of the CSI resource.

The CSI resource needs to include at least one SSB resource or at least one CSI-RS resource in the CSI resource configuration associated with the CSI report configuration, and on this basis, may also include at least one interference measurement resource or at least one RSSI measurement resource in the CSI resource configuration associated with the CSI report configuration.

Z' is the same as Z' recorded in the first embodiment, that is, being the quantity of symbols required for calculating the beam measurement information, and Z' may be obtained based on $BR_i$ that is determined in Table 1 recorded above.

Z is the same as Z recorded in the first embodiment, that is, Z is related to Z', and Z may be determined based on Z' in combination with Table 2 and Table 3 recorded above.

n is an integer greater than or equal to 0.

When the occupancy time of the CSI processing unit starts from the 1st OFDM symbol after the PDCCH triggering the CSI report until one of the first OFDM symbol and the second OFDM symbol, refer to FIG. 9 for ease of understanding.

In FIG. 9, it is assumed that a subcarrier spacing of the terminal device is different from a subcarrier spacing of the network device, and each small square represents one OFDM symbol.

In downlink OFDM symbols, the 2nd to 5th OFDM symbols from left to right are OFDM symbols of the CSI resource transmitted at one time.

In uplink OFDM symbols, when the network device has configured the physical uplink resource, the 2nd and 3rd OFDM symbols from right to left are OFDM symbols of the configured physical uplink resource, that is, OFDM symbols of the PUCCH or PUSCH configured for the CSI report.

It can be seen from FIG. 9 that the occupancy time of the CSI processing unit starts from the 1st OFDM symbol after the PDCCH triggering the CSI report until the first OFDM symbol, that is, until the Z OFDM symbols after the PDCCH triggering the CSI report.

When the occupancy time of the CSI processing unit starts from the 1st OFDM symbol after the PDCCH triggering the CSI report until the later one between the first OFDM symbol and the second OFDM symbol plus n OFDM symbols, refer to FIG. 10 for ease of understanding.

In FIG. 10, it is assumed that n=0, a subcarrier spacing of the terminal device is different from a subcarrier spacing of the network device, and each small square represents one OFDM symbol.

In downlink OFDM symbols, the 2nd to 5th OFDM symbols from left to right are OFDM symbols of the CSI resource transmitted at one time.

In uplink OFDM symbols, when the network device has configured the physical uplink resource, the 2nd and 3rd OFDM symbols from right to left are OFDM symbols of the configured physical uplink resource, that is, OFDM symbols of the PUCCH or PUSCH configured for the CSI report.

It can be seen from FIG. 10 that the occupancy time of the CSI processing unit starts from the 1st OFDM symbol after the PDCCH triggering the CSI report until the relatively late second OFDM symbol between the first OFDM symbol and the second OFDM symbol, that is, until the Z' OFDM symbols after the last OFDM symbol of the CSI resource.

In general, when the CSI report is aperiodic and the network device has configured or has not configured the physical uplink resource, the occupancy time of the CSI processing unit starts from the 1st symbol after the PDCCH triggering the CSI report until n OFDM symbols plus either of or a later one between (1) the Z OFDM symbols after the 1st OFDM symbol that is after the PDCCH triggering the CSI report, and (2) the Z' OFDM symbols after the last OFDM symbol of the CSI resource, where n=0, 1, 2, . . . .

It should be noted that in the foregoing embodiments, triggering an aperiodic CSI report for which reported beam measurement information or reported CSI information has no content and the CSI-RS resource is not used for TRS measurement is considered as triggering an aperiodic CSI report. When one piece of DCI triggers a plurality of aperiodic CSI reports, and one of the CSI reports is an aperiodic CSI report for which reported beam measurement information or reported CSI information has no content and the CSI-RS resource is not used for TRS measurement, Z or Z' is determined according to a rule for triggering a plurality of aperiodic CSI reports in the related art, that is, Z=max (Z (m)), and Z'=max (Z' (m)).

In a special embodiment of this disclosure, when the CSI report type is that the beam measurement information to be reported to the network device has no content and the CSI-RS resource is not used for TRS measurement, it can also be determined that the CSI processing unit is not occupied, that is, the occupancy time of the CSI processing unit is zero. In this case, other processing units in the terminal device may be used for calculating the CSI.

In the technical solutions provided in the embodiments of this disclosure, in beam management, during determining of the occupancy time of the CSI processing unit in the terminal device, the occupancy time of the CSI processing unit may be determined based on the CSI report type in the CSI report configuration, where the CSI report type includes that the CSI information to be reported by the terminal device to the network device is the beam measurement information, or the CSI information to be reported to the network device has no content and the channel state information reference signal (CSI-RS) resource is not used for tracking reference signal (TRS) measurement. In this way, in beam management, in two application scenarios in which the CSI information to be reported to the network device is the beam measurement information, and the reported CSI information has no content and the CSI-RS resource is not used for TRS measurement, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

FIG. 11 is a schematic flowchart of a method for determining an occupancy time of a channel state information (CSI) processing unit according to an embodiment of this disclosure. The method is applied to a terminal device, and the method is described as follows.

S112: When a CSI report configuration is not configured by a network device and a CSI-RS resource configuration is configured by the network device, determine an occupancy time of the CSI processing unit based on a CSI-RS resource transmitted by the network device each time.

In this embodiment of this disclosure, when the network device does not configure the CSI-RS resource configuration, and repetition in the CSI report configuration is set to on (that is, repetition is "on"), a time-domain characteristic of the CSI-RS configured in the CSI-RS resource configuration is periodic CSI-RS, and in this case, the terminal device may perform periodic beam measurement without CSI report; or the CSI-RS resource is configured with a time-domain characteristic of the semi-persistent CSI-RS and is activated, and in this case, the terminal device may perform semi-persistent beam measurement without CSI report.

The determining the occupancy time of the CSI processing unit by the terminal device based on a CSI-RS resource transmitted by the network device each time may include:

the occupancy time of the CSI processing unit starts from the 1st OFDM symbol of a CSI-RS resource until (Z'+y) OFDM symbols after the last OFDM symbol of the CSI-RS resource; where Z' is a quantity of OFDM symbols required for calculating beam measurement information, and y is an integer greater than or equal to 0; and the CSI-RS resource is an earliest CSI-RS resource in at least one CSI-RS resource transmitted each time, or the CSI resource is an earliest CSI-RS resource in at least one most-recently-transmitted CSI-RS resources that are not later than a CSI reference resource corresponding to a CSI report.

The CSI reference resource may be a reference resource defined in a standard of the related art, or may be related to a CSI-RS resource that is transmitted periodically or semi-persistently. When the CSI reference resource is related to the CSI-RS resource transmitted periodically or semi-persistently, the CSI reference resource may be the 1st OFDM symbol of the 1st CSI-RS resource in at least one CSI-RS resource transmitted each time. Symbol, or the last OFDM symbol of the last CSI-RS resource in the at least one CSI-RS resource transmitted each time.

For ease of understanding, refer to FIG. 12 and FIG. 13.

In FIG. 12, the occupancy time of the CSI processing unit may start from the 1st OFDM symbol of the CSI resource (a group of CSI resources in a CSI resource set of the CSI resource configuration transmitted each time) to Z' OFDM symbols after the last OFDM symbol of the last CSI-RS resource transmitted this time, where y=0, and a definition of Z' may be the same as Z' recorded in the embodiment shown in FIG. 1. However, in this embodiment of this disclosure, Z' is determined based on Table 4 and Table 5 below.

TABLE 4

| # | Characteristic group | Composition information | Value |
|---|---|---|---|
| 2-28 | Timing for aperiodic CSI-RS beam switching | A minimum time between DCI triggering the aperiodic CSI-RS and transmission of the aperiodic CSI-RS is at least KBi symbols (including symbols between the last symbol triggering an indication and the 1st symbol transmitting the CSI-RS), where i is a subcarrier spacing (SCS) index, and i being 1 or 2 corresponds to an SCS of 60 kHz or 120 kHz, respectively. | Only applicable to FR2 (frequency range 2, that is, high frequency). Candidate values: {14, 28, 48, 224, 336} |

TABLE 5

| | $Z_3$ [symbol] | |
|---|---|---|
| μ | $Z_1$ | $Z'_1$ |
| 0 | 22 | $X_1$ |
| 1 | 33 | $X_2$ |
| 2 | min(44, $X_3$ + $KB_1$) | $X_3$ |
| 3 | min(97, $X_4$ + $KB_2$) | $X_4$ |

It should be noted that a period and slot offset of beam measurement without CSI report performed by the terminal device may be consistent with a period and slot offset of the periodic CSI-RS or semi-persistent CSI-RS configured in the CSI resource configuration. That is, each time a group of CSI-RS resources of the CSI-RS resource set in the CSI resource configuration is transmitted and repetition is set to "on", the UE may perform a beam measurement without CSI report. The period and slot offset of beam measurement for the CSI report is consistent with a transmission period and slot offset of the periodic or semi-persistent CSI-RS resource.

According to the technical solution provided in this embodiment of this disclosure, in the beam management, in an application scenario in which the CSI report configuration is not configured, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

An embodiment of this disclosure further provides a method for determining a target received power of a PUCCH. Refer to FIG. 14.

FIG. 14 is a schematic flowchart of a method for determining a target received power of a PUCCH according to an embodiment of this disclosure. The method is described as follows.

S142: During link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel (PRACH) and the PRACH is a contention-based PRACH, determine a target received power of a PUCCH based on a target received power configured for a cell and a target received power specific to the terminal device.

In this embodiment of this disclosure, the link recovery process may also be understood as a beam failure recovery process. The link recovery may also be understood as beam failure recovery, and a spatial filtering parameter used for PUCCH transmission may also be understood as a beam used for PUCCH transmission. The target received power configured for the cell may be expressed as $P_{O\_NOMINAL\_PUCCH}$, and the target received power specific to the terminal device may be expressed as $P_{O\_UE\_PUCCH}$.

During determining of the target received power of the PUCCH based on the target received power configured for the cell and the target received power specific to the terminal device, a sum of the target received power configured for the cell and the target received power specific to the terminal device may be used as the target received power of the PUCCH.

In this embodiment of this disclosure, a value of $P_{O\_UE\_PUCCH}$ may be 0, and a value of $P_{O\_NOMINAL\_PUCCH}$ may be a value of a higher-layer-configured parameter, namely a cell-level target received power p0-nominal.

In an implementation, if p0-nominal is not configured by the higher layer, the value of $P_{O\_NOMINAL\_PUCCH}$ may be 0 by default.

In an implementation, if p0-nominal is not configured by the higher layer, the value of $P_{O\_NOMINAL\_PUCCH}$ may be a sum of a preamble target received power and an offset between a message 3 and the preamble target received power, which may be specifically expressed by the following formula:

$$P_{O\_NOMINAL\_PUSCH,f,c}(0) = P_{O\_PRE} + \Delta_{PREAMBLE\_Msg3},$$

where $P_{O\_PRE}$ represents the preamble target received power preambleReceivedTargetPower, $\Delta_{PREAMBLE\_Msg3}$ represents a message 3 offset msg3-DeltaPreamble, and both preambleReceivedTargetPower and msg3-DeltaPreamble are configured by the higher layer.

According to this embodiment of this disclosure, within the time after the terminal device successfully receives the link recovery response from the network device and before the terminal device successfully receives the MAC CE activation or RRC reconfiguration that is related to the PUCCH space-related information, when the spatial filtering parameter used for PUCCH transmission is the same as that of the PRACH and the PRACH is the contention-based PRACH, the target received power of the PUCCH can be clarified based on the target received power configured for the cell and the target received power specific to the terminal device.

Figure 15:
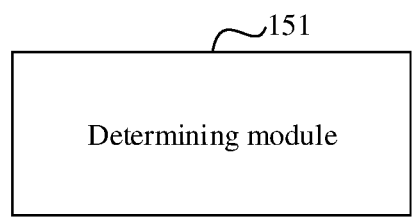
FIG. 15 is a schematic structural diagram of a terminal device according to an embodiment of this disclosure.

FIG. 15 is a schematic structural diagram of a terminal device according to an embodiment of this disclosure. The terminal device includes a determining module 151.

The determining module 151 is configured to determine an occupancy time of a CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement.

Optionally, that the determining module 151 determines the occupancy time of the CSI processing unit based on the CSI report type in the CSI report configuration includes:
when the CSI report type is that the CSI information to be reported to the network device is the beam measurement information, determining the occupancy time of the CSI processing unit based on a time-domain characteristic of the CSI report.

Optionally, that the determining module 151 determines the occupancy time of the CSI processing unit based on the time-domain characteristic of the CSI report includes:
when the time-domain characteristic of the CSI report is periodic or semi-persistent, the occupancy time of the CSI processing unit starts from the 1st orthogonal frequency division multiplexing (OFDM) symbol of a CSI resource until the last OFDM symbol of a physical uplink shared channel (PUSCH) or physical uplink control channel (PUCCH) used for transmitting the CSI report, where
the CSI resource is a most-recently-transmitted CSI resource that is Z' OFDM symbols prior to the 1st OFDM symbol of the PUSCH or the PUCCH, and Z' is a quantity of OFDM symbols required for calculating the beam measurement information.

Optionally, that the determining module 151 determines the occupancy time of the CSI processing unit based on the time-domain characteristic of the CSI report includes:
when the time-domain characteristic of the CSI report is aperiodic, the occupancy time of the CSI processing unit starts from the 1st OFDM symbol after a physical downlink control channel (PDCCH) triggering the CSI report until the last OFDM symbol of a PUSCH transmitting the CSI report.

Optionally, that the determining module 151 determines the occupancy time of the CSI processing unit based on the CSI report type in the CSI report configuration includes:
when the CSI report type is that the CSI information to be reported to the network device has no content and the CSI-RS resource is not used for TRS measurement, determining the occupancy time of the CSI processing unit based on a time-domain characteristic of the CSI report and a configuration status of a physical uplink resource, where the physical uplink resource is a PUCCH resource or a PUSCH resource.

Optionally, that the determining module 151 determines the occupancy time of the CSI processing unit based on the time-domain characteristic of the CSI report and the configuration status of the physical uplink resource includes:
when the time-domain characteristic of the CSI report is periodic or semi-persistent, and the network device has configured the physical uplink resource, the occupancy time of the CSI processing unit starts from the 1st OFDM symbol of a CSI resource until the (1+x)th OFDM symbol of a periodic or semi-persistent PUCCH or PUSCH configured for the CSI report, or until the last OFDM symbol of the periodic or semi-persistent PUCCH or PUSCH configured for the CSI report; where
the CSI resource is an earliest CSI resource in at least one most-recently-transmitted CSI resource that is Z' OFDM symbols prior to the 1st OFDM symbol of the PUSCH or the PUCCH, or the CSI resource is an earliest CSI resource in at least one most-recently-transmitted CSI resource that is not later than a CSI reference resource corresponding to the CSI report, where Z' is a quantity of OFDM symbols required for calculating the beam measurement information, and x is an integer.

Optionally, that the determining module 151 determines the occupancy time of the CSI processing unit based on the time-domain characteristic of the CSI report and the configuration status of the physical uplink resource includes:
when the time-domain characteristic of the CSI report is periodic or semi-persistent, and the network device has configured or has not configured the physical uplink resource, the occupancy time of the CSI processing unit starts from the 1st OFDM symbol of a CSI resource until (Z'+y) OFDM symbols after the last OFDM symbol of the CSI resource, where Z' is a quantity of OFDM symbols required for calculating the beam measurement information, and y is an integer greater than or equal to 0; and
the CSI resource is an earliest CSI resource in at least one CSI resource transmitted each time, or the CSI resource is an earliest CSI resource in at least one most-recently-transmitted CSI resource that is not later than a CSI reference resource corresponding to the CSI report.

Optionally, the CSI reference resource is related to a CSI-RS resource that is transmitted periodically or semi-persistently.

Optionally, when the time-domain characteristic of the CSI report is periodic or semi-persistent, a measurement period and slot offset of a CSI resource are consistent with a transmission period and slot offset of the CSI resource.

Optionally, that the determining module 151 determines the occupancy time of the CSI processing unit based on the time-domain characteristic of the CSI report and the configuration status of the physical uplink resource includes:
- when the time-domain characteristic of the CSI report is aperiodic and the network device has configured the physical uplink resource, the occupancy time of the CSI processing unit starts from the 1st OFDM symbol after a PDCCH triggering the CSI report until the last symbol of a PUSCH configured for the CSI report.

Optionally, that the determining module 151 determines the occupancy time of the CSI processing unit based on the time-domain characteristic of the CSI report and the configuration status of the physical uplink resource includes:
- when the time-domain characteristic of the CSI report is aperiodic and the network device has configured or has not configured the physical uplink resource, the occupancy time of the CSI processing unit starts from the 1st OFDM symbol after a PDCCH triggering the CSI report until one of a first OFDM symbol and a second OFDM symbol, or until a later one between the first OFDM symbol and the second OFDM symbol plus n OFDM symbols; where
- the first OFDM symbol is Z OFDM symbols after the 1st OFDM symbol that is after the PDCCH triggering the CSI report, and the second OFDM symbol is Z' OFDM symbols after the last OFDM symbol of a CSI resource, where Z' is a quantity of OFDM symbols required for calculating the beam measurement information, Z is related to Z', and n is an integer greater than or equal to 0.

Optionally, the CSI resource includes at least one SSB resource or at least one CSI-RS resource in a CSI resource configuration associated with the CSI report configuration; or
- the CSI resource includes at least one SSB resource or at least one CSI-RS resource in a CSI resource configuration associated with the CSI report configuration, and at least one interference measurement resource or at least one received signal strength indicator (RSSI) measurement resource.

Optionally, that the determining module 151 determines the occupancy time of the CSI processing unit based on the CSI report type in the CSI report configuration includes:
- when the CSI report type is that the CSI information to be reported to the network device has no content and the CSI-RS resource is not used for TRS measurement, determining that the CSI processing unit is not occupied.

The terminal device provided in this embodiment of this disclosure is capable of implementing processes that are implemented by the terminal device in the method embodiment of FIG. 1. To avoid repetition, details are not described herein again. In this embodiment of this disclosure, the occupancy time of the CSI processing unit is determined based on the CSI report type in the CSI report configuration, where the CSI report type includes that CSI information to be reported by the terminal device to the network device is the beam measurement information, or the CSI information to be reported to the network device has no content and the channel state information reference signal (CSI-RS) resource is not used for tracking reference signal (TRS) measurement. In this way, in beam management, in two application scenarios in which the CSI information to be reported to the network device is the beam measurement information, and the reported CSI information has no content and the CSI-RS resource is not used for TRS measurement, during determining of the occupancy time of the CSI processing unit in the terminal device, the occupancy time of the CSI processing unit can be clarified based on the technical solutions provided in the embodiments of this disclosure, so that behavior of the terminal device and the network device is clearer.

Figure 16:
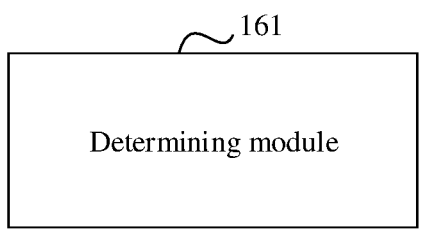
FIG. 16 is a schematic structural diagram of a terminal device according to an embodiment of this disclosure.

FIG. 16 is a schematic structural diagram of a terminal device according to an embodiment of this disclosure. The terminal device includes a determining module 161.

When a CSI report configuration is not configured by a network device and a CSI-RS resource configuration is configured by the network device, the determining module 161 is configured to determine an occupancy time of a CSI processing unit based on a CSI-RS resource transmitted by the network device each time.

Optionally, that the determining module 161 determines the occupancy time of the CSI processing unit based on the CSI-RS resource transmitted by the network device each time includes:
- the occupancy time of the CSI processing unit starts from the 1st OFDM symbol of a CSI resource until (Z'+y) OFDM symbols after the last OFDM symbol of the CSI resource; where
- Z' is a quantity of OFDM symbols required for calculating beam measurement information, and y is an integer greater than or equal to 0; and the CSI resource is an earliest CSI resource in at least one CSI resource transmitted each time, or the CSI resource is an earliest CSI resource in at least one most-recently-transmitted CSI resources that are not later than a CSI reference resource corresponding to the CSI report.

Optionally, the CSI reference resource is related to a CSI-RS resource that is transmitted periodically or semi-persistently.

Optionally, repetition in the CSI-RS resource configuration is set to on;
- a time-domain characteristic of a CSI-RS configured in the CSI-RS resource configuration is a periodic CSI-RS; or the CSI-RS resource configuration is a time-domain characteristic of a semi-persistent CSI-RS and is activated.

Optionally, a beam measurement period and slot offset of a CSI report are consistent with a transmission period and slot offset of a periodic or semi-persistent CSI-RS resource.

The terminal device provided in this embodiment of this disclosure is capable of implementing processes that are implemented by the terminal device in the method embodiment of FIG. 1. To avoid repetition, details are not described herein again. According to this embodiment of this disclosure, in the beam management, in an application scenario in which the CSI report configuration is not configured, during determining of the occupancy time of the CSI processing unit in the terminal device, the occupancy time of the CSI processing unit can be clarified based on the technical solution provided in this embodiment of this disclosure, so that behavior of the terminal device and the network device is clearer.

Figure 17:
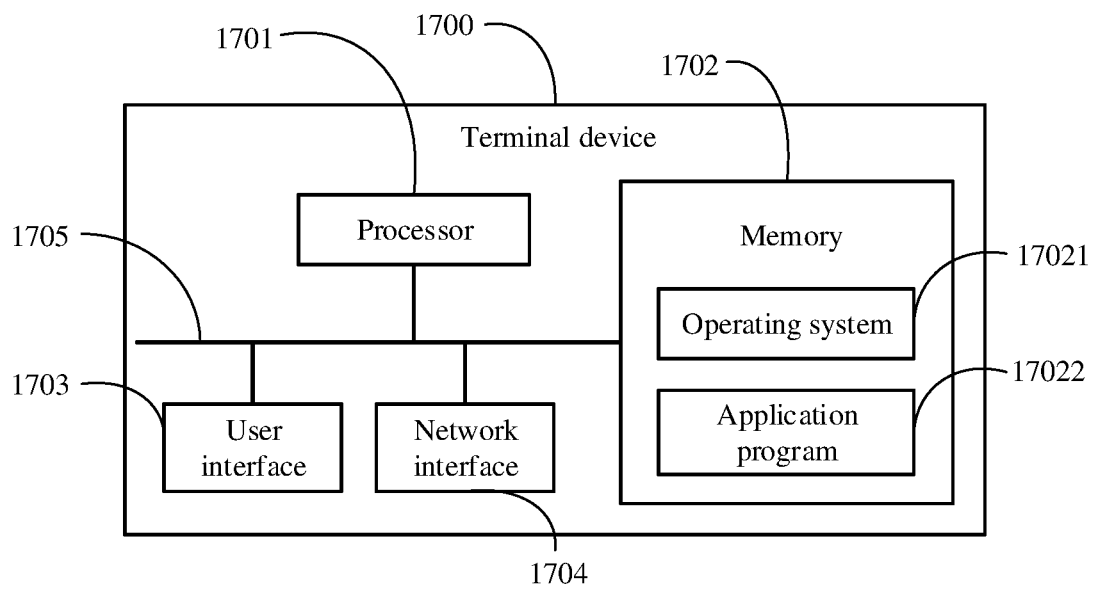
FIG. 17 is a schematic structural diagram of a terminal device according to an embodiment of this disclosure.

In this embodiment of this disclosure, the communications device may include: a network device and a terminal device. When the communications device is a terminal device, as shown in FIG. 17, FIG. 17 is a schematic structural diagram of a terminal device according to an embodiment of this disclosure. The terminal device 1700 shown in FIG. 17 includes at least one processor 1701, a memory 1702, at least one network interface 1704, and a user interface 1703. The components of the terminal device 1700 are coupled together by using a bus system 1705. It can be understood that the bus system 1705 is configured to implement connection communication between these components. The bus system 1705 may include not only a data bus but also a power supply bus, a control bus, and a status signal bus. However, for clear description, various buses in FIG. 17 are marked as the bus system 1705.

The user interface 1703 may include a display, a keyboard, a click device (for example, a mouse or a trackball (trackball)), a touch board, a touchscreen, or the like.

It can be understood that the memory 1702 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 1702 in the system and method described in the embodiments of this disclosure is intended to include but is not limited to these and any other suitable types of memories.

In some implementations, the memory 1702 stores the following components: an executable module or a data structure, or a subset thereof, or an extended set thereof: an operating system 17021 and an application program 17022.

The operating system 17021 includes various system programs, such as a framework layer, a kernel library layer, and a driver layer, and is configured to implement various basic services and process hardware-based tasks. The application program 17022 includes various application programs, such as a media player (Media Player), and a browser (Browser), and is configured to implement various application services. A program that implements the methods of the embodiments of this disclosure may be included in the application program 17022.

In this embodiment of this disclosure, the terminal device 1700 further includes a computer program stored in the memory 1702 and capable of running on the processor 1701. When the computer program is executed by the processor 1701, the following step is implemented:

determining an occupancy time of a CSI processing unit based on a CSI report type in a CSI report configuration, where the CSI report type includes that CSI information to be reported by the terminal device to a network device is beam measurement information, or that the CSI information to be reported to the network device has no content and a channel state information reference signal (CSI-RS) resource is not used for tracking reference signal (TRS) measurement;

or when a CSI report configuration is not configured by a network device and a CSI-RS resource configuration is configured by the network device, determining an occupancy time of a CSI processing unit based on a CSI-RS resource transmitted by the network device each time.

The method for determining the occupancy time of the channel state information (CSI) processing unit disclosed in the foregoing embodiment of this disclosure may be applied to the processor 1701 or be implemented by the processor 1701. The processor 1701 may be an integrated circuit chip with a signal processing capability. In an implementation process, the steps of the methods may be implemented by an integrated logical circuit of hardware in the processor 1701, or by a software instruction. The processor 1701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1701 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 1702, and the processor 1701 reads information in the memory 1702 and implements, in combination with its hardware, the steps of the foregoing methods. Specifically, a computer program is stored in the computer-readable storage medium, and when the computer program is executed by the processor 1701, the steps of the embodiment of the method for determining an occupancy time of a channel state information (CSI) processing unit are implemented.

It can be understood that the embodiments described in this disclosure may be implemented by hardware, software, firmware, middleware, microcode, or a combination thereof. For hardware implementation, processing units can be implemented in one or more application specific integrated circuits (ASIC), digital signal processors (DSP), digital signal processing devices (DSPD), programmable logic devices (PLD), field-programmable gate arrays (FPGA), general-purpose processors, microcontrollers, microprocessors, other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The terminal device 1700 is capable of implementing each process implemented by the terminal device in the foregoing embodiments. To avoid repetition, details are not described herein again.

An embodiment of this disclosure further provides a computer-readable storage medium. One or more programs are stored in the computer-readable storage medium, and the one or more programs include instructions. When the instructions are executed by a communications device that includes a plurality of application programs, the communications device can execute the method of the embodiment shown in FIG. 1 or FIG. 11, and is specifically configured to execute the steps of the method for determining an occupancy time of a channel state information (CSI) processing unit recorded above.

Figure 18:
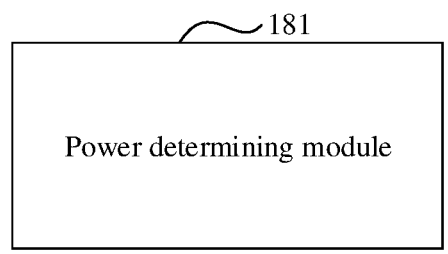
FIG. 18 is a schematic structural diagram of a terminal device according to an embodiment of this disclosure.

FIG. 18 is a schematic structural diagram of a terminal device according to an embodiment of this disclosure. The terminal device includes a power determining module 181.

The power determining module 181 is configured to: during link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel (PRACH) and the PRACH is a contention-based PRACH, determine a target received power of a PUCCH based on a target received power configured for a cell and a target received power specific to the terminal device.

Optionally, that the power determining module 181 determines the target received power of the PUCCH based on the target received power configured for the cell and the target received power specific to the terminal device includes:
using a sum of the target received power configured for the cell and the target received power specific to the terminal device as the target received power of the PUCCH.

Optionally, a value of the target received power specific to the terminal device is 0.

Optionally, if the target received power configured for the cell is not configured by the network device, a value of the target received power configured for the cell is 0, or is a sum of a preamble target received power and an offset between a message 3 and the preamble target received power.

The terminal device provided in this embodiment of this disclosure is capable of implementing processes that are implemented by the terminal device in the method embodiment of FIG. 14. To avoid repetition, details are not described herein again. According to this embodiment of this disclosure, within the time after the terminal device successfully receives the link recovery response from the network device and before the terminal device successfully receives the MAC CE activation or RRC reconfiguration that is related to the PUCCH space-related information, when the spatial filtering parameter used for PUCCH transmission is the same as that of the PRACH and the PRACH is the contention-based PRACH, the target received power of the PUCCH can be clarified based on the target received power configured for the cell and the target received power specific to the terminal device.

Figure 19:
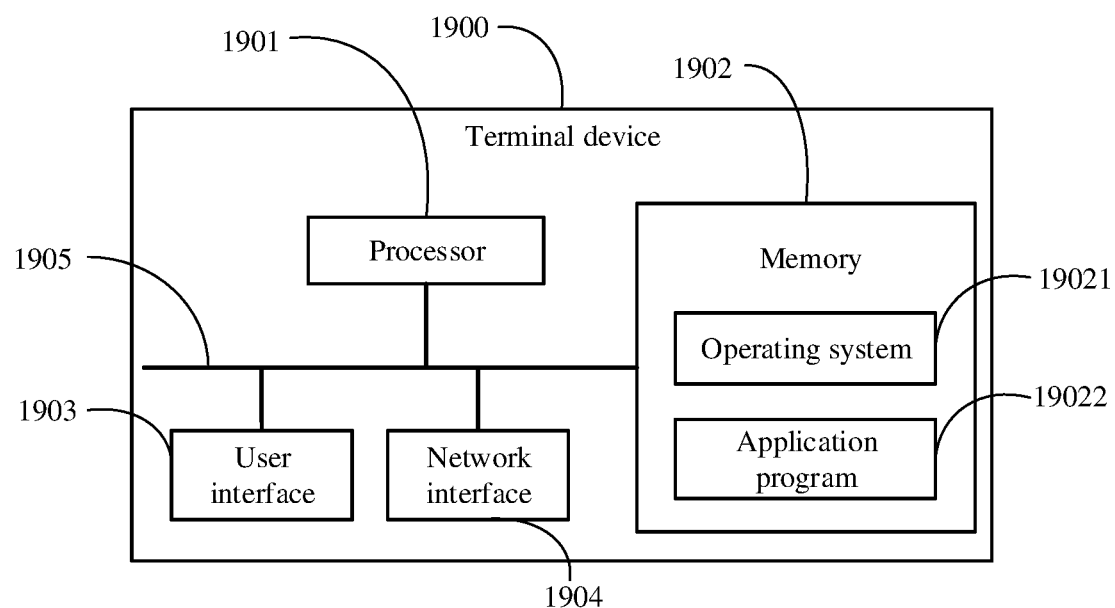
FIG. 19 is a schematic structural diagram of a terminal device according to an embodiment of this disclosure.

In this embodiment of this disclosure, the communications device may include: a network device and a terminal device. When the communications device is a terminal device, as shown in FIG. 19, FIG. 19 is a schematic structural diagram of a terminal device according to an embodiment of this disclosure. The terminal device 1900 shown in FIG. 19 includes at least one processor 1901, a memory 1902, at least one network interface 1904, and a user interface 1903. The components of the terminal device 1900 are coupled together by using a bus system 1905. It can be understood that the bus system 1905 is configured to implement connection communication between these components. The bus system 1905 may include not only a data bus but also a power supply bus, a control bus, and a status signal bus. However, for clear description, various buses in FIG. 19 are marked as the bus system 1905.

The user interface 1903 may include a display, a keyboard, a click device (for example, a mouse or a trackball (trackball)), a touch board, a touchscreen, or the like.

It can be understood that the memory 1902 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 1902 in the system and method described in the embodiments of this disclosure is intended to include but is not limited to these and any other suitable types of memories.

In some implementations, the memory 1902 stores the following components: an executable module or a data structure, or a subset thereof, or an extended set thereof: an operating system 19021 and an application program 19022.

The operating system 19021 includes various system programs, such as a framework layer, a kernel library layer, and a driver layer, and is configured to implement various basic services and process hardware-based tasks. The application program 19022 includes various application programs, such as a media player (Media Player), and a browser (Browser), and is configured to implement various application services. A program that implements the methods of the embodiments of this disclosure may be included in the application program 19022.

In this embodiment of this disclosure, the terminal device 1900 further includes a computer program stored in the memory 1902 and capable of running on the processor 1901. When the computer program is executed by the processor 1901, the following step is implemented:
during link recovery, within a time after a terminal device successfully receives a link recovery response from a network device and before the terminal device successfully receives MAC CE activation or radio resource control RRC reconfiguration signaling that is related to PUCCH space-related information, when a spatial filtering parameter used for PUCCH transmission is the same as a spatial filtering parameter of a physical random access channel (PRACH) and the PRACH is a contention-based PRACH, determining a target received power of a PUCCH based on a target received power configured for a cell and a target received power specific to the terminal device.

The method for determining the target received power of the PUCCH disclosed in the foregoing embodiment of this disclosure is applicable to the processor 1901, or implemented by the processor 1901. The processor 1901 may be an integrated circuit chip with a signal processing capability. In an implementation process, the steps of the methods may be implemented by an integrated logical circuit of hardware in the processor 1901, or by a software instruction. The processor 1901 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor 1901 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 1902, and the processor 1901 reads information in the memory 1902 and implements, in combination with its hardware, the steps of the foregoing methods. Specifically, a computer program is stored in the computer-readable storage medium, and when the computer program is executed by the processor 1901, the steps of the embodiment of the method for determining the target received power of the PUCCH are implemented.

It can be understood that the embodiments described in this disclosure may be implemented by hardware, software, firmware, middleware, microcode, or a combination thereof. For hardware implementation, processing units can be implemented in one or more application specific integrated circuits (ASIC), digital signal processors (DSP), digital signal processing devices (DSPD), programmable logic devices (PLD), field-programmable gate arrays (FPGA), general-purpose processors, microcontrollers, microprocessors, other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The terminal device 1900 is capable of implementing each process implemented by the terminal device in the foregoing embodiments. To avoid repetition, details are not described herein again.

An embodiment of this disclosure further provides a computer-readable storage medium. One or more programs are stored in the computer-readable storage medium, and the one or more programs include instructions. When the instructions are executed by a communications device that includes a plurality of application programs, the communications device can execute the method of the embodiment shown in FIG. 14, and is specifically configured to execute the steps of the method for determining the target received power of the PUCCH recorded above.

In summary, the foregoing descriptions are merely examples of the embodiments of this disclosure, but are not intended to limit the protection scope of this disclosure. Any modification, equivalent replacement, and improvement made without departing from the spirit and principle of this disclosure shall fall within the protection scope of this disclosure.

The system, apparatus, module, or unit illustrated in the foregoing embodiments may be specifically implemented by a computer chip or entity, or may be implemented by a product having a function. A typical implementation device is a computer. Specifically, the computer may be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

The computer-readable medium includes a permanent medium, a non-permanent medium, a movable medium, and a non-movable medium, and is capable of implementing information storage by using any method or technology. Information may be a computer readable instruction, a data structure, a program module, or other data. Examples of the storage media of the computer include, but are not limited to, a phase change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disk (DVD) or other optical storage, a magnetic cassette tape, a magnetic tape storage or other magnetic storage devices or any other non-transmission media; and may be used to store information that can be accessed by the computing devices. As defined in this specification, the computer-readable media do not include transitory media (transitory media), such as modulated data signals and carriers.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for determining an occupancy time of a channel state information (CSI) processing unit, applied to a terminal device and comprising:
    for a CSI report with CSI report configuration with report Quantity set to 'none' and a Channel State Information-Reference Signals (CSI-RS) resource set associated with the CSI report is not configured with higher-layer parameter trs-Info, determining an occupancy time of the CSI processing unit based on a time-domain characteristic of the CSI report;
    wherein determining an occupancy time of the CSI processing unit based on a time-domain characteristic of the CSI report comprises:
    when the time-domain characteristic of the CSI report is periodic or semi-persistent, determining that the occupancy time of the CSI processing unit starts from the 1st Orthogonal Frequency Division Multiplexing (OFDM) symbol of a CSI resource until Z' OFDM symbols after the last OFDM symbol of the CSI resource;
    when the time-domain characteristic of the CSI report is aperiodic, determining that the occupancy time of the CSI processing unit starts from the 1st OFDM symbol after a PDCCH triggering the CSI report until a later one between the first OFDM symbol and the second OFDM symbol, the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z and Z' are quantities related to OFDM symbols required for calculating CSI, and Z and Z' are positive integers.

2. The method according to claim 1, wherein the method further comprises:
    for the CSI information to be reported to the network device being the beam measurement information, determining the occupancy time of the CSI processing unit based on a time-domain characteristic of a CSI report.

3. The method according to claim 1, wherein Z' is a quantity related to OFDM symbols required for calculating the beam measurement information; and
    the CSI resource is an earliest CSI resource in at least one CSI resource transmitted each time, or the CSI resource is an earliest CSI resource in at least one most-recently-transmitted CSI resource that is not later than a CSI reference resource corresponding to the CSI report.

4. The method according to claim 3, wherein the CSI reference resource is related to a CSI-RS resource that is transmitted periodically or semi-persistently.

5. The method according to claim 1, wherein
    the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z' is a quantity related to OFDM symbols required for calculating the beam measurement information, Z is related to Z'.

6. The method according to claim 1, wherein
    the CSI resource comprises at least one SSB resource or at least one CSI-RS resource in a CSI resource configuration associated with the CSI report configuration; or
    the CSI resource comprises at least one SSB resource or at least one CSI-RS resource in a CSI resource configuration associated with the CSI report configuration, and at least one interference measurement resource or at least one received signal strength indicator (RSSI) measurement resource.

7. The method according to claim 1, wherein when the time-domain characteristic of the CSI report is periodic or semi-persistent, a measurement period and slot offset of a CSI resource are consistent with a transmission period and slot offset of the CSI resource.

8. A terminal device, comprising: a processor, a memory, and a computer program stored in the memory and capable of running on the processor, and the computer program is executed by the processor to perform:
    for a CSI report with CSI report configuration with report Quantity set to 'none' and a Channel State Information-Reference Signals (CSI-RS) resource set associated with the CSI report is not configured with higher-layer parameter trs-Info, determining an occupancy time of the CSI processing unit based on a time-domain characteristic of the CSI report;
    wherein the computer program is executed by the processor to perform:
    when the time-domain characteristic of the CSI report is periodic or semi-persistent, determining that the occupancy time of the CSI processing unit starts from the 1st OFDM Orthogonal Frequency Division Multiplexing (OFDM) symbol of a CSI resource until Z' OFDM symbols after the last OFDM symbol of the CSI resource;
    when the time-domain characteristic of the CSI report is aperiodic, determining that the occupancy time of the CSI processing unit starts from the 1st OFDM symbol after a PDCCH triggering the CSI report until a later one between the first OFDM symbol and the second OFDM symbol, the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z and Z' are quantities related to OFDM symbols required for calculating CSI, and Z and Z' are positive integers.

9. The terminal device according to claim 8, wherein the computer program is executed by the processor to further perform:
    for the CSI information to be reported to the network device being the beam measurement information, determining the occupancy time of the CSI processing unit based on a time-domain characteristic of a CSI report.

10. The terminal device according to claim 8, wherein Z' is a quantity related to OFDM symbols required for calculating the beam measurement information; and
    the CSI resource is an earliest CSI resource in at least one CSI resource transmitted each time, or the CSI resource is an earliest CSI resource in at least one most-recently-transmitted CSI resource that is not later than a CSI reference resource corresponding to the CSI report.

11. The terminal according to claim 10, wherein the CSI reference resource is related to a CSI-RS resource that is transmitted periodically or semi-persistently.

12. The terminal device according to claim 8, wherein the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z' is a quantity related to OFDM symbols required for calculating the beam measurement information, Z is related to Z'.

13. The terminal device according to claim 8, wherein
the CSI resource comprises at least one SSB resource or at least one CSI-RS resource in a CSI resource configuration associated with the CSI report configuration; or
the CSI resource comprises at least one SSB resource or at least one CSI-RS resource in a CSI resource configuration associated with the CSI report configuration, and at least one interference measurement resource or at least one received signal strength indicator RSSI measurement resource.

14. The terminal according to claim 8, wherein when the time-domain characteristic of the CSI report is periodic or semi-persistent, a measurement period and slot offset of a CSI resource are consistent with a transmission period and slot offset of the CSI resource.

15. A non-transitory computer-readable storage medium, wherein one or more programs are stored in the non-transitory computer-readable storage medium, and the programs are executed by a processor to:
for a CSI report with CSI report configuration with report Quantity set to 'none' and a Channel State Information-Reference Signals (CSI-RS) resource set associated with the CSI report is not configured with higher-layer parameter trs-Info, determine an occupancy time of the CSI processing unit based on a time-domain characteristic of the CSI report;
wherein the programs are further executed by the processor to:
when the time-domain characteristic of the CSI report is periodic or semi-persistent, determine that the occupancy time of the CSI processing unit starts from the 1st OFDM-Orthogonal Frequency Division Multiplexing (OFDM) symbol of a CSI resource until Z' OFDM symbols after the last OFDM symbol of the CSI resource;
when the time-domain characteristic of the CSI report is aperiodic, determine that the occupancy time of the CSI processing unit starts from the 1st OFDM symbol after a PDCCH triggering the CSI report until a later one between the first OFDM symbol and the second OFDM symbol, the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z and Z' are quantities related to OFDM symbols required for calculating CSI, and Z and Z' are positive integers.

16. The non-transitory computer-readable storage medium according to claim 15, wherein the programs are further executed by the processor to, for the CSI information to be reported to the network device being the beam measurement information, determine the occupancy time of the CSI processing unit based on a time-domain characteristic of a CSI report.

17. The non-transitory computer-readable storage medium according to claim 15, wherein Z' is a quantity related to OFDM symbols required for calculating the beam measurement information; and
the CSI resource is an earliest CSI resource in at least one CSI resource transmitted each time, or the CSI resource is an earliest CSI resource in at least one most-recently-transmitted CSI resource that is not later than a CSI reference resource corresponding to the CSI report.

18. The non-transitory computer-readable storage medium according to claim 17, wherein the CSI reference resource is related to a CSI-RS resource that is transmitted periodically or semi-persistently.

19. The non-transitory computer-readable storage medium according to claim 15, wherein the first OFDM symbol is Z OFDM symbols after the 1st OFDM symbol that is after the PDCCH triggering the CSI report, and the second OFDM symbol is Z' OFDM symbols after the last OFDM symbol of a CSI resource, wherein Z' is a quantity related to OFDM symbols required for calculating the beam measurement information, Z is related to Z'.

20. The non-transitory computer-readable storage medium according to claim 15, wherein when the time-domain characteristic of the CSI report is periodic or semi-persistent, a measurement period and slot offset of a CSI resource are consistent with a transmission period and slot offset of the CSI resource.

* * * * *